(12) United States Patent
Yokoyama et al.

(10) Patent No.: US 7,733,528 B2
(45) Date of Patent: Jun. 8, 2010

(54) PRINTING METHOD FOR DETERMINING COLOR LOSS IN A COLOR PRINTER, AND A MANAGEMENT PRINT MEDIUM

(75) Inventors: Kazuyuki Yokoyama, Nagano-ken (JP); Akihiro Goto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 486 days.

(21) Appl. No.: 11/829,297

(22) Filed: Jul. 27, 2007

(65) Prior Publication Data

US 2008/0037068 A1 Feb. 14, 2008

(30) Foreign Application Priority Data

Aug. 11, 2006 (JP) .............................. 2006-219350

(51) Int. Cl.
*H04N 1/50* (2006.01)
*B41J 29/393* (2006.01)
*B41J 2/21* (2006.01)

(52) U.S. Cl. ........................... 358/1.9; 358/504; 347/19
(58) Field of Classification Search .................. 358/1.9, 358/2.1, 504; 347/19, 43, 115; 399/14, 15, 399/49
See application file for complete search history.

(56) References Cited

U.S. PATENT DOCUMENTS 6,331,042 B1 12/2001 Yamada
6,454,380 B1 9/2002 Endo
6,478,400 B1 11/2002 Endo
6,853,464 B1 2/2005 Ueda et al.
2008/0079978 A1* 4/2008 Horiuchi .................... 358/1.13

FOREIGN PATENT DOCUMENTS

| JP | 08018767 | 1/1996 |
|----|----------|--------|
| JP | 11192771 | 7/1999 |
| JP | 2000071547 | 3/2000 |
| JP | 2000190469 | 7/2000 |
| JP | 2000287093 | 10/2000 |
| JP | 200147665 | 2/2001 |
| JP | 2003311939 | 11/2003 |
| JP | 2004195862 | 7/2004 |
| JP | 2005178164 | 7/2005 |

* cited by examiner

*Primary Examiner*—Scott A Rogers

(57) ABSTRACT

A management label has a color loss determination area that enables easy determination of color loss. An identification color printing area 11 where an inventory control color for managing products and a color loss determination area 15 for determining color loss are printed on the label side 10*a* of an inventory management label 10. The color loss determination area 15 contains a color loss determination section 18 including the letters "NG" printed with a black coloring agent, and a background portion 19 that is printed using cyan, magenta, and yellow coloring agents. When there is no color loss and the letters "NG" and background portion 19 are printed normally, the letters "NG" and background portion 19 are both gray and the "NG" letters cannot be read. If one of the colors is lost, the printed colors change, the letters "NG" become discernable, and color loss can be easily determined.

8 Claims, 5 Drawing Sheets

FIG. 4A

| COLOR CODE ||
|---|---|
| COLOR | WAREHOUSE NAME |
| RED | WAREHOUSE A |
| BLUE | WAREHOUSE B |
| YELLOW | WAREHOUSE C |
| GREEN | WAREHOUSE D |

FIG. 4B

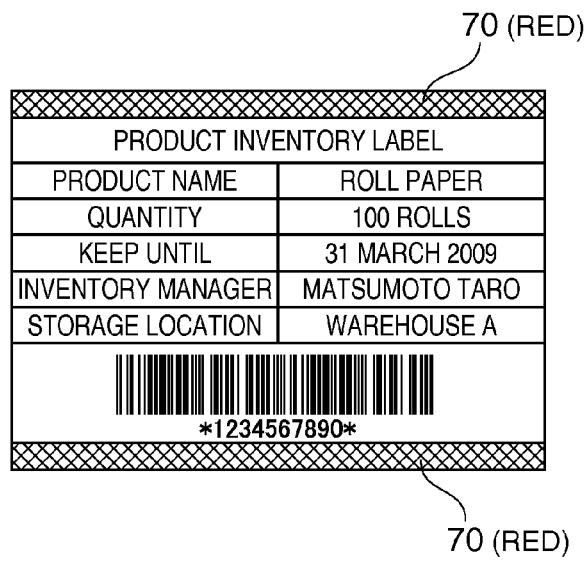

70 (RED)

| PRODUCT INVENTORY LABEL ||
|---|---|
| PRODUCT NAME | ROLL PAPER |
| QUANTITY | 100 ROLLS |
| KEEP UNTIL | 31 MARCH 2009 |
| INVENTORY MANAGER | MATSUMOTO TARO |
| STORAGE LOCATION | WAREHOUSE A |

*1234567890*

70 (RED)

FIG. 4C

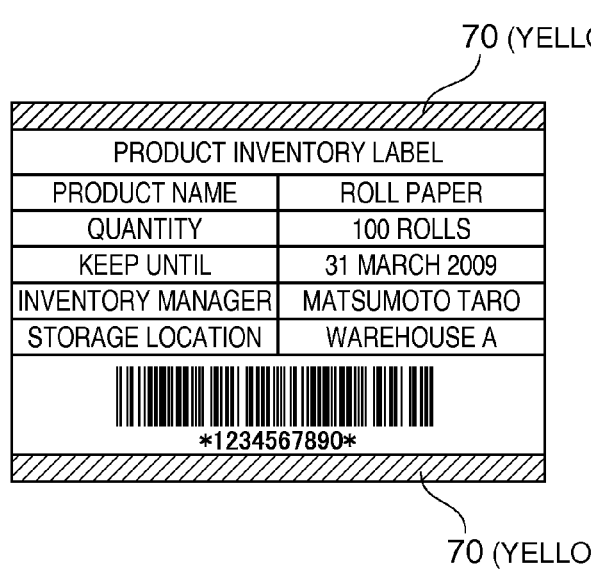

70 (YELLOW)

| PRODUCT INVENTORY LABEL ||
|---|---|
| PRODUCT NAME | ROLL PAPER |
| QUANTITY | 100 ROLLS |
| KEEP UNTIL | 31 MARCH 2009 |
| INVENTORY MANAGER | MATSUMOTO TARO |
| STORAGE LOCATION | WAREHOUSE A |

*1234567890*

70 (YELLOW)

PRINTING METHOD FOR DETERMINING COLOR LOSS IN A COLOR PRINTER, AND A MANAGEMENT PRINT MEDIUM

CROSS-REFERENCE TO RELATED APPLICATIONS

Japanese patent application No. 2006-219350 is hereby incorporated by reference in its entirety.

BACKGROUND OF THE INVENTION

1. Field of Invention

The present invention relates to a color loss determination printing method that enables easily determining loss of color ink in a color printer that prints in color using multiple colors of ink. The invention also relates to inventory management print media such as labels having a color loss determination area that is printed by the color loss determination printing method.

In the following specification, the term "ink" will be used for convenience. However, it is intended that "ink" shall be interpreted herein as a generic term that covers ink, toner, thermal print materials, or any other coloring agent that can be used to print in color. The terms "color ink" and "coloring agent" may be used interchangeably herein as generic terms that represent a liquid or material that can be used in color printing.

2. Description of Related Art

When products are distributed to and stored in multiple warehouses, an inventory management label on which are printed the product name and the name of the warehouse where the product will be stored is applied to the surface of the cardboard box in which the products are packaged. A color that is assigned to each warehouse name is also printed in an area of the inventory management label that is easy to read so that the person routing the products to the different warehouses can easily determine where to send each box.

If red (R) is assigned to warehouse A, blue (B) to warehouse B, yellow (Y) to warehouse C, and green (G) to warehouse D as shown in FIG. 4A, the inventory management labels that are used for storing roll paper in warehouse A, for example, are printed with red denoting warehouse A. In the sample inventory management label shown in FIG. 4B, the strips 70 at the top and bottom of the inventory management label are the identification color printing area where red is printed on the inventory management label.

An inventory management label with an identification color printing area is commonly printed using a color inkjet printer that prints using four colors of ink, black (K), cyan (C), magenta (M) and yellow (Y), for example. Such inkjet printers print the color assigned to each warehouse in the identification color printing area by overlaying different colors of ink in a known ratio in order to print a desired color.

If, when printing the inventory management labels with an inkjet printer the identification color printing area is printed without using one of the required colors because the supply of that color ran out, for example, the identification color printing area will be printed with a uniform color just as when the identification color printing area is printed normally but the resulting color will differ from the color that should be printed. This is referred to as "color loss."

As shown in FIG. 4C, when the inventory management label shown in FIG. 4B is printed when magenta (M) is lost, the strips 70 of the inventory management label are printed yellow (Y). As shown in FIG. 5, the red (R) that is desired to be printed in the strips 70 is printed normally using magenta (M) and yellow (Y) inks (red is the complement of magenta and yellow). However, only yellow (Y) is printed if magenta (M) is lost, and the resulting label will be printed with yellow (Y) denoting warehouse C. As a result, the worker reading the inventory management label printed with color loss may very likely send the boxes containing roll paper to warehouse C instead of the correct warehouse A. The worker will not realize that the wrong color has been printed because the label will still look ok.

The same problem occurs when other colors of ink are lost. Referring to FIG. 5, blue (B) is printed normally using cyan (C) and magenta (M) inks (blue is the complement of cyan and magenta). Therefore. only magenta (M) ink will be printed if cyan (C) is lost, and the color printed in the identification color printing area will be magenta (M), which can easily be mistaken for red (R).

Likewise, green (G) is printed normally using cyan (C) and yellow (Y) inks (green is the complement of cyan and yellow). Therefore, only cyan (C) ink will be printed if yellow (Y) is lost, and the color printed in the identification color printing area will be cyan (C), which can easily be mistaken for blue (B).

Japanese Unexamined Patent Appl. Pub. JP-A-H09-66650, for example, teaches a method of confirming whether each color of ink is discharged normally from the ink nozzles of the inkjet head by printing a test pattern. However, even if a test pattern is printed and it is confirmed that there is no color loss at the start of printing, this method cannot determine if color loss suddenly occurs while printing is in progress.

It is also conceivable to limit the colors printed in the identification color printing area to the four primary ink colors. If only the primary colors are then printed, the base color of the inventory management label will appear in the identification color printing area if one of the colors is lost, and color loss can be easily confirmed. This does not allow management using more than four colors, however, and is therefore not practical.

It is also conceivable to print a color sample 75 having four printing areas each printed with one of the colors black (K), cyan (C), magenta (M), and yellow (Y) as shown in FIG. 6 in a prescribed area of the management label so that color loss can be determined from this color sample 75. Color loss can be confirmed if any one of the four printing areas is not printed in the color sample 75.

However, looking at a color sample 75 having four small printing areas and confirming whether each of the printing areas is correctly printed is bothersome and time-consuming. In addition, the area printed with yellow (Y) ink can be difficult to discern because of the small area, and confirming color loss is not easy. A problem with the color loss determination printing method that prints such a color sample 75 is that it is difficult to readily and accurately evaluate color loss.

SUMMARY OF THE INVENTION

A printing method according to the present invention for determining color loss in a color printer enables easy determination of color loss. An inventory management label printing medium according to another aspect of the invention enables easy determination of color loss.

A first aspect of the invention is a printing method for determining color loss in a color printer, comprising steps of: using the color printer to form a color loss determination section by printing at least one letter, a graphic, or a symbol in a prescribed printing area on a surface of a print medium using a single coloring agent; and using the color printer to print a background portion of the color loss determination section in the prescribed printing area by overlaying a plurality of coloring agents that are each individually different in color from the single coloring agent so that the background portion is the same color as the at least one letter, graphic, or symbol; and enabling determining that at least one coloring agent used to print the color loss determination section did not print if the print color of the at least one letter, graphic, or symbol is different from the print color of the background portion.

This aspect of the invention enables determining that at least one color of ink is missing if the print color of the text, graphic, or symbol in the color loss determination section differs from the print color of the background portion. Because color loss can be determined from the text, graphic, or symbol, color loss can be determined quickly and easily. Determining color loss is also accurate because there is no need to confirm low visibility printing areas such as printing areas printed with yellow ink.

In another aspect of the invention the at least one letter, graphic, or symbol is formed by overlaying and printing coloring agents of a plurality of colors instead of using the single coloring agent; and the background portion is formed by printing the single coloring agent instead of using the coloring agents of a plurality of colors.

Further preferably, if the single coloring agent is black; the color of the plural coloring agents include cyan, magenta, and yellow; and the print color of the at least one letter, graphic, or symbol and the print color of background portion are both black, or are both gray and have the same brightness level.

Yet further preferably, the surface color of the print medium is white.

If the single color ink used to form the color loss determination section is dropped in this case, the at least one letter, graphic, or symbol will appear white and can be easily visually separated from the background portion.

In the printing method for determining color loss in a color printer according to another aspect of the invention, the prescribed printing area includes at least a first printing area and a second printing area; the first printing area is printed using a first group of coloring agents; the second printing area is printed using a second group of coloring agents; and at least one coloring agent included in the second group of coloring agents is different from the coloring agents included in the first group of coloring agents.

If a color ink for which color loss cannot be determined from the color loss determination section formed in the first printing area is used, loss of that color ink can be determined from the print results of the color loss determination section formed in the other printing area.

An inkjet printer can be used as the color printer to which the invention is applied. Inkjet printers have a separate ink tank and ink nozzle group for each color ink that is used, and if a particular color is lost because of clogged ink nozzles or a problem with the ink tank installation, the method of the invention enables taking appropriate remedial action.

Another aspect of the invention is a management print medium having the color loss determination section formed by the printing method according to the present invention for determining color loss in a color printer, and an identification color printing area that is printed using at least one of the coloring agents used to print the color loss determination section.

The management print medium according to the invention has a color loss determination area that enables determining if one of the color inks used to print an identification color printing area has been dropped. A person looking at the management print medium can therefore know if the color printed in the identification color printing area is the correct color printed with no color loss. Appropriate action can therefore be taken even if the identification color printing area is printed with a missing color.

Preferably, the management print medium also has a text printing area where management text information corresponding to the color printed in the identification color printing area is printed. If the identification color printing area is printed while missing one of the component colors due to color loss, this aspect of the invention enables one to read the management information identified by the color code from the textual management information so that appropriate action can be taken.

When the print color of the text, graphic, or symbol in the color loss determination section differs from the print color of the background portion and the difference is visually obvious, the printing method for determining color loss in a color printer according to the invention enables determining that at least one of the color inks is missing. Color loss can also be determined quickly and easily because color loss can be determined from the text, graphic, or symbol. Determining color loss is also accurate because there is no need to confirm low visibility printing areas such as areas printed with yellow ink.

The management print medium according to the invention has a color loss determination area that enables determining if a color ink used to print an identification color printing area is missing. A person that sees the management print medium can thus know if the print color in the identification color printing area is the correct color.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4A, 4B, and 4C are used to describe an inventory management label according to the related art.

DESCRIPTION OF THE PREFERRED EMBODIMENTS

Preferred embodiments of the present invention are described below with reference to the accompanying figures.

In the following detailed description, the term "ink" will be used for convenience. However, it is intended that "ink" shall be interpreted herein as a generic term that covers ink, toner, thermal print materials, or any other coloring agent that can be used to print in color. The terms "color ink" and "coloring agent" may be used interchangeably herein as generic terms that represent a liquid or material that can be used in color printing.

Inventory Management Label Printing System

Figure 1:
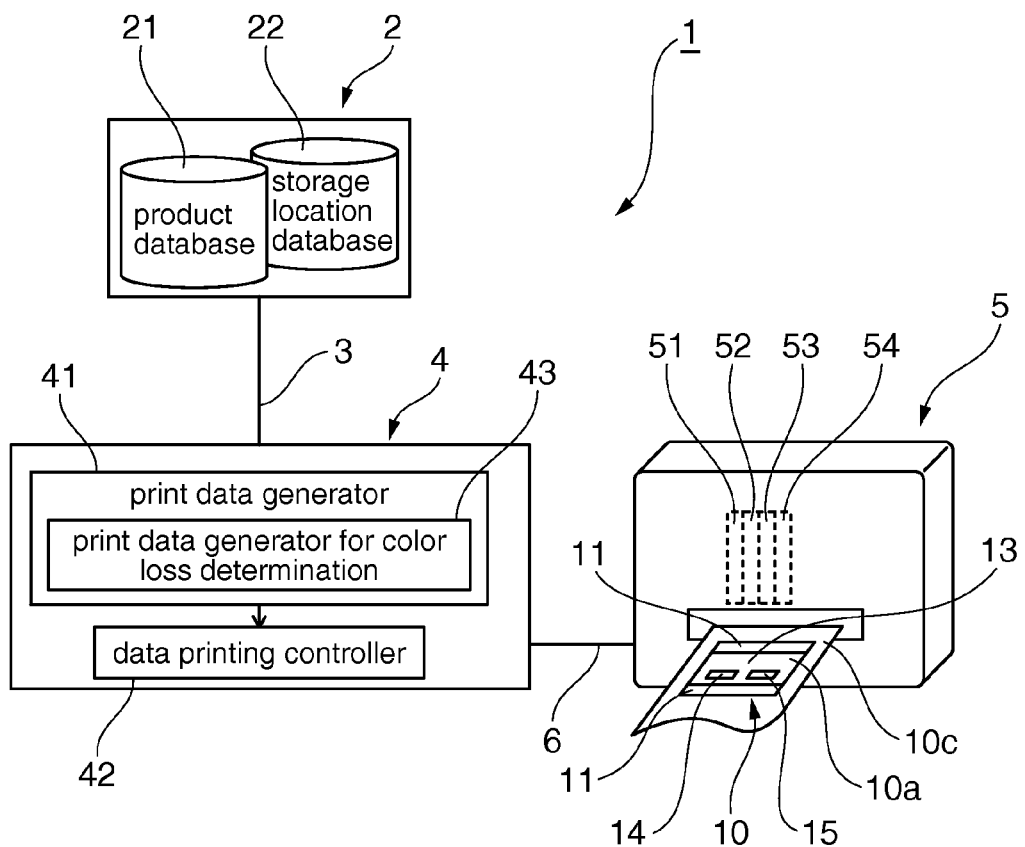
FIG. 1 is a schematic diagram of an inventory management label printing system according to a preferred embodiment of the invention.

FIG. 1 is a schematic diagram of an inventory management label printing system for printing inventory management labels using the method of the invention. This inventory management label printing system 1 includes a data management server 2, a computer 4 connected to the data management server 2 by a network 3, and an inkjet printer 5 connected to the computer 4 by a cable 6.

The inkjet printer 5 is a color printer enabling full-color printing using four colors of ink, specifically black, cyan, magenta, and yellow in this embodiment of the invention.

The computer 4 accesses the data management server 2 to generate the print data to be printed on the inventory management labels 10, and controls driving of the inkjet printer 5 to print the print data on the label side 10a of each inventory management label 10.

The data management server 2 stores a product database 21 and a storage location database 22. The product database 21 contains information about the inventoried products such as the product name, total product count, product storage period, and product inventory manager. The storage location database 22 stores information about where the products are stored, such as the warehouse name, the name of the identification color (inventory control color) assigned to each warehouse, and warehouse space availability information.

The computer 4 has a print data generator 41 and a data printing controller 42. The print data generator 41 accesses the data management server 2 to generate the print data. The data printing controller 42 controls driving of the inkjet printer 5 to print the print data. The print data generator 41 also includes a print data generator for color loss determination 43 for generating the print data producing a color loss determination area 15 that enables visual confirmation that color loss occurred when printing an inventory management label 10 printed by the inkjet printer 5.

The inventory management labels 10 are affixed at a regular interval on the surface of a long coated web 10c backer so that the inventory management labels 10 can be easily peeled from the web 10c. After printing, the inventory management labels 10 are peeled from the web 10c and applied to a side of the cardboard box in which the product is packed. The individual boxes containing the product are then distributed to and stored in a plurality of warehouses based on the printed content on the label side 10a of the inventory management labels 10.

The print data generator 41 retrieves the necessary information from the product database 21 and the storage location database 22 to generate the print data. The resulting print data includes the name of the packaged product, the packaged quantity, how long the product is kept in the warehouse, the inventory manager in charge of the product, the name of the warehouse where the product is stored, a barcode for getting this information, and the name of the inventory control color assigned to the warehouse where the product is stored.

The data printing controller 42 prints the product name, quantity, storage period, manager's name, and warehouse name in a text printing area 13 on the label side 10a. The data printing controller 42 also prints a barcode 14 below the text printing area 13, and prints the color corresponding to the color name in the identification color printing area 11.

Figure 2A:
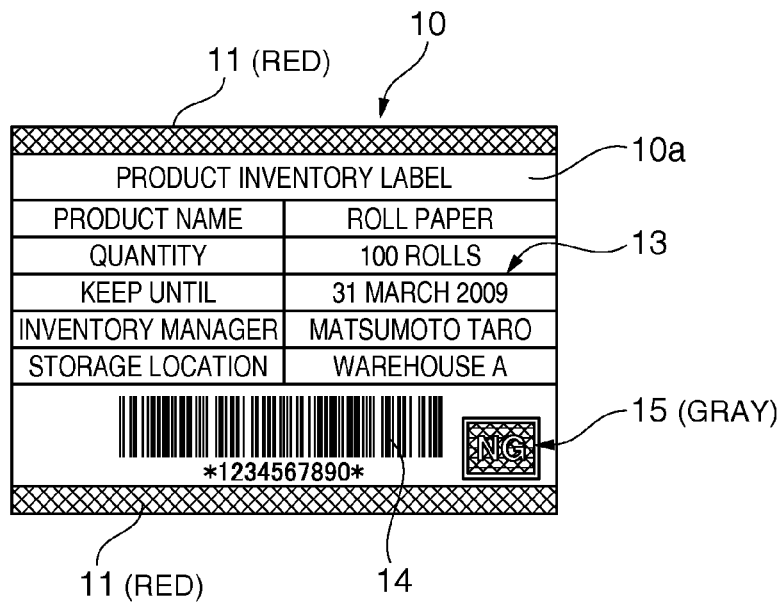
FIGS. 2A and 2B show the arrangement of the label side of an inventory management label printed using the invention.

The print data generator for color loss determination 43 forms, by printing, a color loss determination section 18 in a rectangular printing area on the label. See FIG. 2B, for example. The color loss determination section 18 contains, for example, the letters "NG" 16 in black ink (to form a shade of gray) and a contour portion 17 around the rectangular printing area. A background portion 19 is printed behind the letters "NG" 16 by overlaying the three colors cyan, magenta, and yellow. The letters "NG" 16 and the background portion 19 are printed using the same gray color so that they are not visually discernible. This is shown in FIG. 2A as the entire color loss determination are being printed in one shade of gray. Each time the data printing controller 42 prints the print data, the print data generator for color loss determination 43 also forms the color loss determination area 15 on the label side 10a.

Inventory Management Labels

Figure 2B:
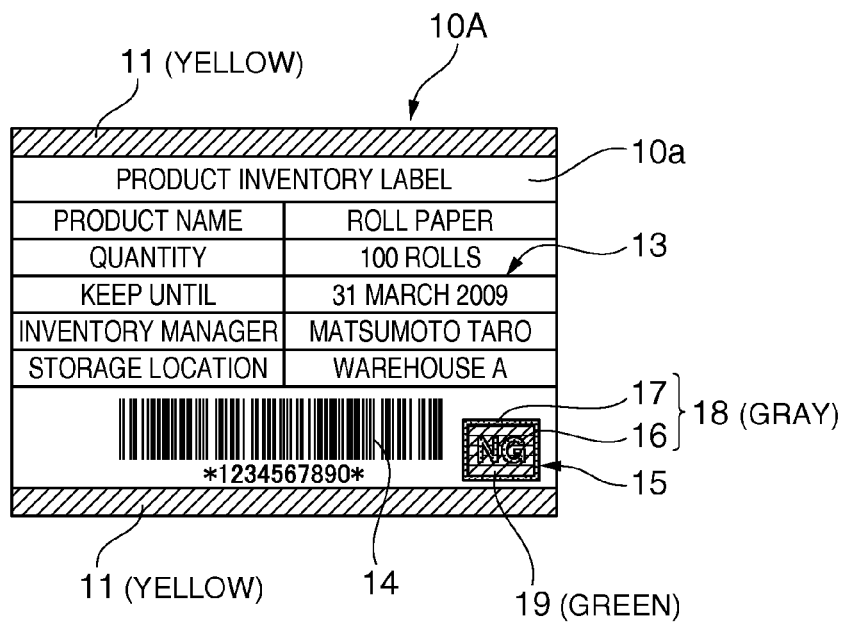

FIG. 2 shows examples of the label side 10a of inventory labels 10 printed by the inventory management label printing system 1. FIG. 2A shows a label printed when there is no color loss, and FIG. 2B shows a label printed with cyan color loss.

As shown in FIG. 2A, the label side 10a of the inventory management label 10 is rectangular with a white base.

The inventory control color assigned to each warehouse is printed as a stripe in a identification color printing area 11 at the top and bottom edges of the label side 10a so that workers can easily determine the destination warehouse of a carton.

The text printing area 13, where textual inventory management information including the product name and warehouse name is printed, is located in the middle part of the label side 10a.

A barcode 14 printing area and the color loss determination area 15 for determining if there was any color loss while printing the inventory management label 10 are located between the text printing area 13 and the lower identification color printing area 11.

The name of the packaged product, the packaged quantity, how long the product is kept in the warehouse, the inventory manager in charge of the product, and the name of the warehouse where the product is stored are printed in the text printing area 13. The barcode 14 is for identifying this information.

The color loss determination area 15 is a rectangular printing area including the color loss determination section 18. The color loss determination section 18 contains, for example, the letters "NG" printed using black ink, and the background portion 19 is the background to the letters "NG." The background portion 19 is printed in the same shade of gray as the letters "NG" by overlaying three colors of ink: cyan, magenta, and yellow. The letters "NG" are exemplary. A single letter, a graphic, a symbol, or any type of indicia could be used as long as it is visually discernable from the background portion 19.

On a inventory management label 10 printed with no color loss the inventory control color assigned to the destination warehouse is printed in the identification color printing area 11. Using the table in FIG. 4A, for example, red is assigned to warehouse A, blue to warehouse B, yellow to warehouse C, and green to warehouse D. In this case a red stripe is printed in the identification color printing area 11 of the inventory management labels 10 that are applied to cardboard boxes stored in warehouse A, and gray is printed in the color loss determination area 15 of a inventory management label 10 that is printed with no color loss.

On an inventory management label 10A that is printed when cyan ink is lost as shown in FIG. 2B, however, the color printed in the identification color printing area 11 is yellow, that is, the inventory control color assigned to warehouse C, instead of the red that is assigned as the inventory control color to warehouse A. This is because there is no cyan ink and therefore only yellow is printed. This also causes the color of the background portion 19 printed in the color loss determination area 15 to print in green, and causes the letters "NG" 16, which are printed in gray and indicate that one of the printing colors is lost, to stand out from the background portion 19 so that they are easily recognized.

The person printing the labels and the person distributing the cartons can thus readily know when looking at this inventory management label 10A that the inventory management label 10A was printed without the correct colors because the letters "NG" 16 can be easily seen and read on the label side 10a.

Furthermore, when the worker sees that the inventory management label 10A was printed with the wrong color, the worker can ignore the printed color and send the carton of roll paper in this example to the correct warehouse A based on the warehouse name printed in text in the text printing area 13 so that the product is not stored in the wrong place.

Color Loss Determination Area

Figure 3:
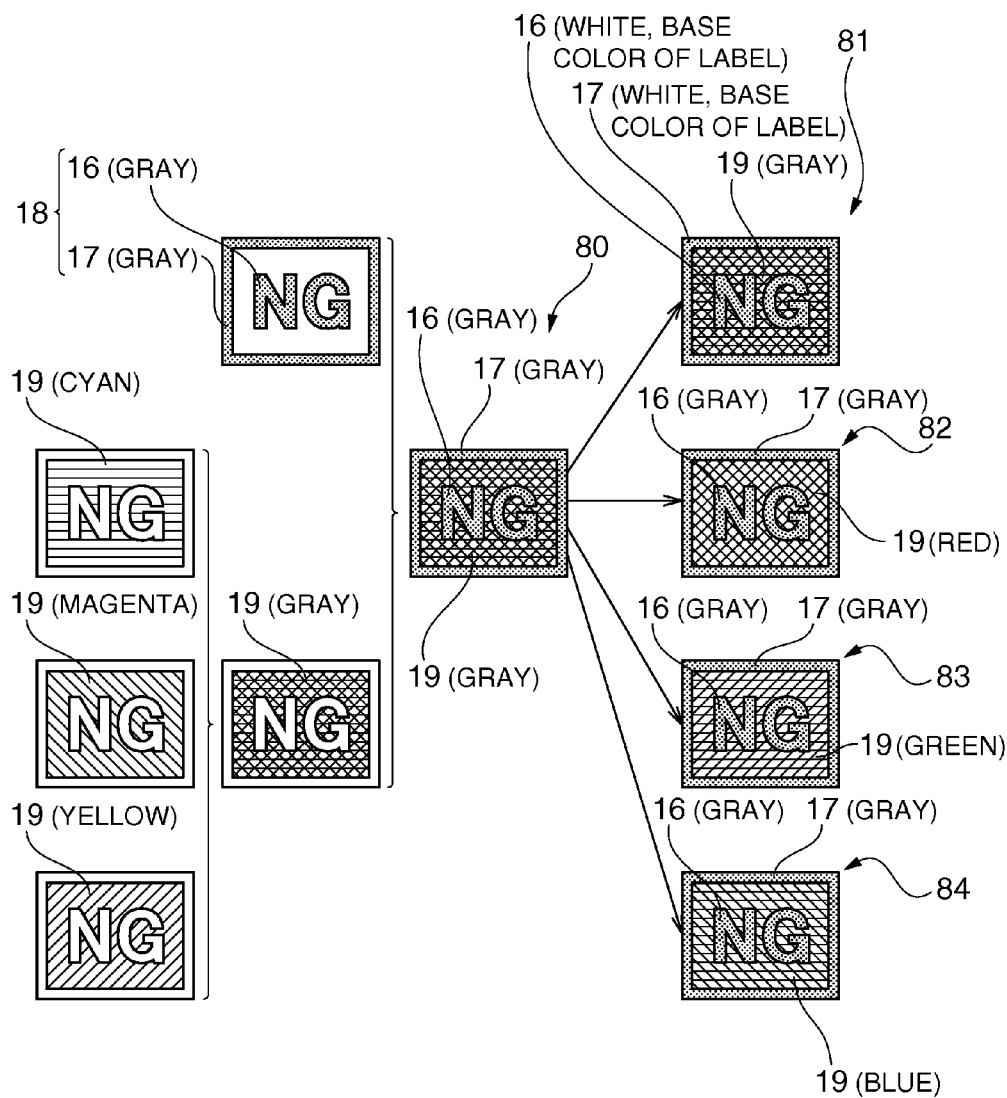
FIG. 3 is used to describe the arrangement of the color loss determination area.
Figure 5:
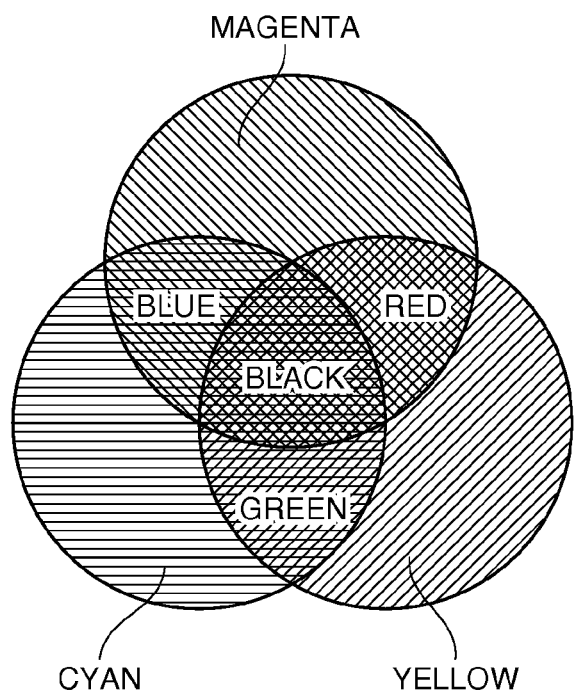
FIG. 5 is used to describe the colors resulting from printing with one or more source colors missing.
Figure 6:
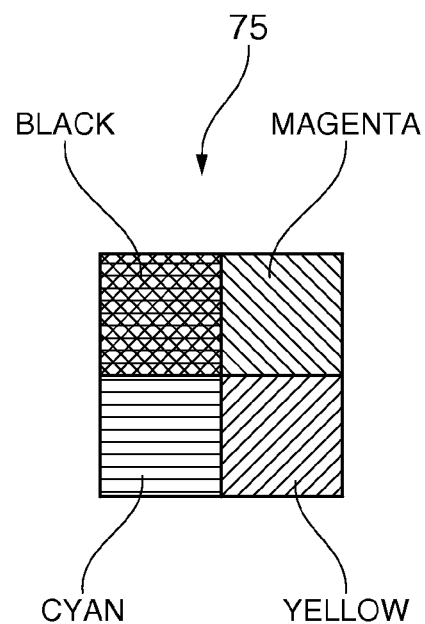
FIG. 6 shows an example of a print sample according to the related art.

The color loss determination area 15 printed on the label side 10a is described in detail next with reference to FIG. 3. As described above, the color loss determination area 15 in this embodiment of the invention includes the color loss determination section 18 composed of the letters "NG" 16 and the rectangular window frame contour portion 17, and the background portion 19 that includes all of the color loss determination section 18 except for the letters "NG" 16.

The color loss determination section 18 is printed using black ink, and the letters "NG" 16 and the rectangular contour portion 17 are printed by dithering the printed color so that both are the same shade of gray. The background portion 19 is printed by dithering the three colors of ink, cyan, magenta, and yellow, so that the background portion 19 is also the same shade of gray. The gray printed for the letters "NG" 16 and the gray printed in the background portion 19 are controlled to achieve the same brightness level. As a result, the entire color loss determination area 15 appears as a solid block of gray when there is no color loss, and the letters "NG" 16 in the color loss determination section 18 are visually indiscernible in the printed output 80 of this color loss determination area 15. In FIG. 3, sections 16, 17 and 19 are shown as being visually discernable in block 80 for the purposes of description, but when printed on label 10, area 15 (including 16, 17, and 19) appear as a solid gray block in printed output 80 when there is no color loss.

If black is lost, the letters "NG" 16 will not be printed, and the base white of the label side 10a will be left in the printed output 81. This causes the letters "NG" 16 to appear in the gray background portion 19 as white letters. The letters "NG" 16 can thus be visually discerned and the inventory management label 10 can be recognized as having been printed with color loss.

When cyan is lost the printed output 82 contains the letters "NG" 16 printed in gray but the background portion 19 is printed in red instead of gray, and the letters "NG" 16 can thus be recognized from the background. This is because the background portion 19 which should be printed using cyan, magenta, and yellow to produce gray looks red as a result of mixing only magenta and yellow, due to the loss of cyan.

When magenta is lost the printed output 83 contains the letters "NG" 16 printed in gray but the background portion 19 is printed in green instead of gray, and the letters "NG" 16 can thus be recognized from the background. This is because the background portion 19 which should be printed using cyan, magenta, and yellow to produce gray looks green as a result of mixing only cyan and yellow, due to the loss of magenta.

When yellow is lost the printed output 83 contains the letters "NG" 16 printed in gray but the background portion 19 is printed in blue instead of gray, and the letters "NG" 16 can thus be recognized from the background. This is because the background portion 19 which should be printed using cyan, magenta, and yellow to produce gray looks blue as a result of mixing only cyan and magenta, due to the loss of yellow.

As described above, when at least any one of the black, cyan, magenta, and yellow color inks that are used to print inventory management labels is missing, the letters "NG" 16 meaning "No Good" appear in an easily readable manner in the color loss determination area 15 of an inventory management label 10 printed by the inventory management label printing system 1 according to this embodiment of the invention. Both the label maker and the workers handling the boxes can thus immediately know when looking at a inventory management label 10 if the inventory management label 10 was printed without the correct colors, and steps to correct the color loss or direct the box to the correct warehouse can be taken quickly and easily.

Furthermore, by printing the color loss determination section 18 using the two simple letters "NG" 16 containing few picture elements, the letters stand out from the background portion 19 and can be easily read when color loss occurs even if the printing area in which the color loss determination section 18 and background portion 19 are formed is small.

Yet further, because a text printing area 13 is also included on the label side 10a of the inventory management label 10, products can be accurately distributed and stored in the correct warehouse based on the textual inventory management information printed in the text printing area 13 even if the inventory management label 10 is printed with the wrong color due to color loss.

Furthermore, in previous solutions for determining color loss when a color sample is printed to determine if all colors of ink are being used, the printing condition of all four colors of ink 51 to 54 must be confirmed. This is bothersome and it can also be difficult to determine if a low visibility ink such as yellow is being used normally. The present invention enables evaluating color loss by simply looking for the letters "NG" 16 to appear in the color loss determination area 15, and color loss determination is thus quick and easy.

Other Embodiments

The foregoing embodiment uses black ink for the letters "NG" 16 and the three ink colors cyan, magenta, and yellow to print the background portion 19. This ink usage can be reversed, however, so that the letters "NG" 16 are printed using the three ink colors cyan, magenta, and yellow, and the background portion 19 is printed using black ink. The normal print color of the letters "NG" 16 and the background portion 19 when there is no color loss can also be black instead of gray.

The colors of ink used to print the letters "NG" 16 and the background portion 19 are also not limited to the four colors black, cyan, magenta, and yellow, and the color loss determination area 15 is also not limited to one area.

For example, the inventory management label 10 could be printed using light cyan and light magenta in addition to the four colors of black, cyan, magenta, and yellow. In this case a first color loss determination area can be printed similarly to the color loss determination area 15 described above, and a second color loss determination area can be printed as described below.

In the second color loss determination area black ink is used to form the letters "NG" that are printed gray, and the background portion can be printed gray using the three colors light cyan, light magenta, and yellow. If at least one of these six colors of ink is lost, the letters "NG" 16 will appear in at least one of the first and second color loss determination areas, and it can be easily determined that a color is missing.

More specifically, any combination of plural color inks that can produce the print color of the letters "NG" 16 using a single color of ink, and can produce the same print color in the background portion 19 using a combination of plural colors of ink that are different from the single color of ink producing the letters "NG" 16, can be used to form the color loss determination area 15.

An inkjet printer 5 is used by way of example as the color printer in the foregoing embodiments, but the invention can also be used to print labels using other types of color printers. The invention can also be used with laser printers and thermal printers, for example.

Furthermore, the letters "NG" 16 are used in the color loss determination section 18 in the embodiments described above, but any letter or letters, symbol or graphic element that enables determining at a glance if printing was completed correctly can be used.

Adhesive labels having an adhesive layer on the reverse side are used by way of example as a management print medium above, but other types of print media including baggage tags and other types of tags, and bands of various types can be used. For example, the wristbands that are printed and wrapped around the wrist of patients entering the hospital often contain color-coded blood type and allergy information. The invention can be used to print the color loss determination area 15 on such wristbands as a way of preventing medical errors.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing method for determining color loss in a color printer, comprising steps of:
    using the color printer to form a color loss determination section by printing at least one letter, a graphic, or a symbol in a prescribed printing area on a surface of a print medium using a single coloring agent; and
    using the color printer to print a background portion of the color loss determination section in the prescribed printing area by overlaying a plurality of coloring agents that are each individually different in color from the single coloring agent so that the background portion is the same color as the at least one letter, graphic, or symbol; and
    enabling determining that at least one coloring agent used to print the color loss determination section did not print if the print color of the at least one letter, graphic, or symbol is different from the print color of the background portion.

2. The printing method for determining color loss in a color printer described in claim 1, wherein:
    the at least one letter, graphic, or symbol is formed by overlaying and printing coloring agents of a plurality of colors instead of using the single coloring agent; and
    the background portion is formed by printing the single coloring agent instead of using the coloring agents of a plurality of colors.

3. The printing method for determining color loss in a color printer described in claim 1, wherein:
    the single coloring agent is black;
    the color of the plural coloring agents including cyan, magenta, and yellow; and
    the print color of the at least one letter, graphic, or symbol and the print color of background portion are both black, or are both gray and have the same brightness level.

4. The printing method for determining color loss in a color printer described in claim 1, wherein:
    the print medium has a white surface.

5. The printing method for determining color loss in a color printer described in claim 1, wherein:
    the prescribed printing area includes at least a first printing area and a second printing area;
    the first printing area is printed using a first group of coloring agents;
    the second printing area is printed using a second group of coloring agents; and
    at least one coloring agent included in the second group of coloring agents is different from the coloring agents included in the first group of coloring agents.

6. The printing method for determining color loss in a color printer described in claim 1, wherein:
    an inkjet printer is used as the color printer to form the color loss determination section.

7. A management print medium comprising:
    a color loss determination area including the color loss determination section formed by the printing method for determining color loss in a color printer described in claim 1; and
    an identification color printing area that is printed using at least one of the color agents used to print the color loss determination section.

8. The management print medium described in claim 7, further comprising:
    a text printing area where management text information corresponding to the color printed in the identification color printing area is printed.

* * * * *